United States Patent
Kikukawa et al.

[11] Patent Number: 6,125,101
[45] Date of Patent: Sep. 26, 2000

[54] PHASE-CHANGE TYPE OPTICAL RECORDING MEDIUM HAVING RECORDING MARKS WIDER THAN A RECORDING TRACK

[75] Inventors: Takashi Kikukawa; Hajime Utsunomiya, both of Tokyo, Japan

[73] Assignee: TDK Corporation, Tokyo, Japan

[21] Appl. No.: 09/352,781

[22] Filed: Jul. 14, 1999

[30] Foreign Application Priority Data

Jul. 21, 1998 [JP] Japan ................................. 10-221043
Jun. 25, 1999 [JP] Japan ................................. 11-179286

[51] Int. Cl.$^7$ ........................................................ G11B 7/24
[52] U.S. Cl. ................................................... 369/275.4
[58] Field of Search ............................ 369/275.4, 275.2, 369/275.1, 274, 288; 430/270.13; 428/64.1, 64.4

[56] References Cited

U.S. PATENT DOCUMENTS 5,383,176  1/1995  Inui et al. ............................ 369/275.4
5,407,720  4/1995  Omata .................................... 428/64.4
5,493,552  2/1996  Kobori ................................... 369/109
5,493,561  2/1996  Nishiuchi et al. .................... 369/275.1
5,581,539  12/1996  Horie et al. .......................... 369/275.4

FOREIGN PATENT DOCUMENTS 3-183024  8/1991  Japan .

*Primary Examiner*—Tan Dinh
*Attorney, Agent, or Firm*—Oblon, Spivak, McClelland, Maier & Neustadt, P.C.

[57] ABSTRACT

Deterioration of properties associated with high-density recording is suppressed in the recording of a phase change optical recording medium wherein a land or groove is used for the recording track. A method for recording an optical recording medium having a substrate having grooves formed thereon and a recording layer of phase change type on the substrate wherein a groove or a land between two adjacent grooves is used for the recording track is provided. In this method, the record marks are formed such that:

$M_W/T_W > 1$ when $T_W$ is width of the recording track, and $M_W$ is width of the record mark.

13 Claims, 2 Drawing Sheets

1 μm

PHASE-CHANGE TYPE OPTICAL RECORDING MEDIUM HAVING RECORDING MARKS WIDER THAN A RECORDING TRACK

BACKGROUND OF THE INVENTION

1. Field of the Invention

This invention relates to a method for recording an optical recording disc of phase change type.

2. Discussion of the Background

Highlight is recently focused on optical recording media capable of recording information at a high density and erasing the recorded information for overwriting. One typical overwritable optical recording media is a phase change optical recording medium wherein a laser beam is directed to the recording layer to change its crystalline states whereupon a change of reflectance by the crystallographic change is detected for reproduction of the information. The phase change optical recording media are of great interest since the medium can be overwritten by modulating the intensity of a single laser beam and the optical system of the drive unit used for their operation is simple as compared with magneto-optical recording media.

Most optical recording media of phase change type used chalcogenide systems such as Ge—Te system and Ge—Sb—Te system which provide a substantial difference in reflectance between crystalline and amorphous states and have a relatively stable amorphous state. It was also recently proposed to use new compounds known as chalcopyrites. Chalcopyrite compounds have been investigated as compound semiconductor materials and have been applied to solar batteries and the like. The chalcopyrite compounds are composed of Ib-IIIb-VIb$_2$ or IIb-IVb-Vb$_2$ as expressed in terms of the Groups of the Periodic Table and have two stacked diamond structures. The structure of chalcopyrite compounds can be readily determined by X-ray structural analysis and their basic characteristics are described, for example, in Physics, Vol. 8, No. 8 (1987), pp. 441 and Denki Kagaku (Electrochemistry), Vol. 56, No. 4 (1988), pp. 228. Among the chalcopyrite compounds, AgInTe$_2$ is known to be applicable as a recording material by diluting it with Sb or Bi. The resulting optical recording media are generally operated at a linear velocity of about 7 m/s. See Japanese Patent Application Kokai Nos. (JP-A) 240590/1991, 99884/1991, 82593/1991, 73384/1991, and 151286/1992. In addition to the optical recording media of phase change type wherein chalcopyrite compounds are used, optical recording media of phase change type wherein AgSbTe$_2$ phase is formed with the crystallization of the recording layer is disclosed in JP-A 267192/1992, 232779/1992, and 166268/1994.

In the phase change optical recording medium, grooves for tracking are formed on the substrate, and addressing information is often stored in the grooves. Recently, land/groove recording capable of high-density recording have gone into actual use, and in such land/groove recording, both the grooves and the lands between two adjacent grooves are used for the recording tracks. For example, DVD-RAM adopts a land/groove recording system.

DVD-RAM of a land/groove recording system, however, is incompatible with conventional read-only optical disc (DVD-ROM), and a countermeasure had to be taken on the side of the drive to enable the reproduction on both the DVD-RAM and the DVD-ROM. In other words, the DVD-RAM can not be reproduced on a player specifically designed for the DVD-ROM.

To produce an optical recording disc which can be reproduced on the player specifically designed for the DVD-ROM, groove recording is generally employed although land recording is also adoptable. In either case, use of either one of the groove and the land for the recording track is required.

When a recording density higher than that of the DVD-ROM (recording capacity, 4.7 GB) is to be realized by a medium of groove recording or land recording, width of the recording track (groove width or land width) should be reduced to an extremity, and it will be difficult to ensure sufficient degree of modulation and to minimize the jitter.

SUMMARY OF THE INVENTION

An object of the present invention is to minimize the degradation of recording properties associated with the high-density recording of a phase change optical recording medium wherein the land or the groove is used for the recording track.

Such an object is realized by the constitution of any one of methods (1) to (8), below.

(1) A method for recording an optical recording medium having a substrate having grooves formed thereon and a recording layer of phase change type on the substrate wherein a groove or a land between two adjacent grooves is used for the recording track, and wherein the record marks are formed such that:

$M_W/T_W > 1.3$ when $T_W$ is width of the recording track, and $M_W$ is width of the record mark.

(2) The optical recording method according to the above (1) wherein the record marks are formed such that:

$M_W/T_W \geq 1.3$ (3) The optical recording method according to the above (1) wherein the record marks are formed such that:

$M_W/T_W \geq 1.5$ (4) The optical recording method according to the above (1) wherein the $M_W$ is set such that:

$M_W \leq 1.2(G_W + L_W)$ when $G_W$ is width of the groove, and $L_W$ is width of the land.

(5) The optical recording method according to the above (1) wherein the record marks are formed such that:

$M_W/M_L \geq 1$ when $M_L$ is length of the shortest record mark.

(6) The optical recording method according to the above (5) wherein the record marks are formed such that:

$M_W/M_L \leq 4$ (7) The optical recording method according to the above (1) wherein the groove has a depth Gd such that:

$G_d < \lambda/8n$ when $G_d$ is depth of the groove, n is refractive index of the substrate, and $\lambda$ is wavelength of the recording or reproducing beam.

(8) The optical recording method according to the above (1) wherein, in said optical recording medium, the record marks are amorphous and the non-recorded area is crystalline.

DETAILED DESCRIPTION OF THE INVENTION

JP-A 183024/1991 describes a recording method wherein separatory area between the recording tracks (said separatory area corresponding to the lands when the grooves are used for the recording tracks) is preliminarily recorded to an uniform recording state before forming the record marks on the track. This recording method has the merit of reducing the cross talk between the adjacent tracks when the width of the record marks exceeded the width of the tracks due to the high-density recording. JP-A 183024/1991 shares a common feature with the present invention that the record mark width is larger than the track width, while JP-A 183024/1991 differs from the present invention in that the separatory area is preliminarily brought to a recorded state. It should be noted that, in JP-A 183024/1991, a recording method wherein the separatory area is not recorded to an uniform recording state is also described as a prior art example or a comparative example.

JP-A 183024/1991, however, is silent about the idea of actively compensating the, degradation of C/N, degree of modulation, jitter and other properties associated with the high-density recording. More illustratively, JP-A 183024/1991 does not disclose the optimal condition for utilizing the record mark which extends beyond the recording track as an effective signal. In contrast, the present invention describes an optimal way for determining the groove depth. In addition, the present invention describes an optimal shape of the record mark ($M_W/M_L$ as mentioned above) when the record mark extends beyond the recording track.

In addition, JP-A 183024/1991 only describes the constitution wherein the record marks are crystalline, and overwriting is not taken into consideration. When the record mark width exceeds the recording track pitch in the disc of such constitution wherein the non-recorded region is amorphous and the record marks are crystalline, the record marks of adjacent two tracks are likely to become linked with each other rendering accurate reproduction impossible. In contrast, in the present invention wherein the non-recorded region is crystalline and the record marks are amorphous, separatory area is inevitably formed between the record marks even if the record marks of adjacent two tracks should overlap with each other. Therefore, the present invention is advantageous in reproducing the signals.

Furthermore, JP-A 183024/1991 does not take compatibility with read-only (ROM) disc into consideration.

Next, the preferred embodiments of the present invention are described.

In the optical recording disc of the present invention, the recording layer is formed on the substrate having the grooves formed thereon, and the grooves or the lands between two adjacent grooves are used for the recording tracks.

Figure 1:
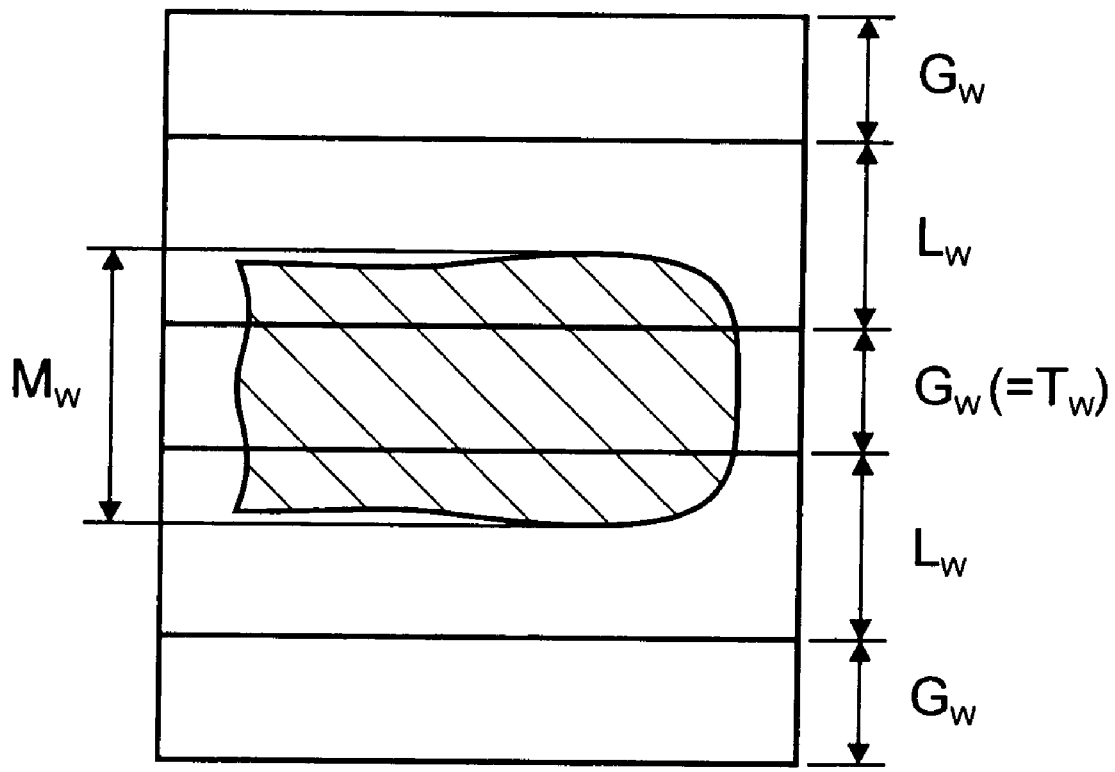
FIG. 1 is a schematic view describing the relation between the recording track and the record mark in the optical recording medium of the present invention.

FIG. 1 schematically shows the state wherein the record marks are formed in the recording tracks of the optical recording medium of the present invention. In FIG. 1, the hatched area is the record mark, $T_W$ is width of the recording track, $M_W$ is width of the record mark, $G_W$ is width of the groove, and $L_W$ is width of the land. In the embodiment of FIG. 1, $T_W$ is equal to $G_W$ since the groove is used for the recording track.

In the present specification, the record mark width $M_W$ is the maximum width of the record mark as shown in FIG. 1. The record marks, however, include a plurality of record marks each having different length depending on the encoding system. Therefore, in the calculation of $M_W$, at least five record marks are measured for the record marks of each length to thereby calculate the average maximum width for the record marks of the particular length. The average $M_W$ is then calculated by averaging the thus obtained averages of the record marks each having different lengths. It should be noted that an excessive difference between the maximum widths of the record marks of different mark lengths is generally avoided, for example, by regulating the modulation pattern of the recording laser beam.

In the optical recording medium of the present invention, the record marks are formed such that:

$M_W/T_W > 1$

In the optical recording medium adapted for high-density recording, spot diameter of the reproducing laser beam is generally larger than the width of the recording track. Therefore, when $M_W/T_W \leq 1$, namely, when the record mark exists only in the recording track, the proportion of the record marks in the spot of the reproducing laser beam will be relatively small to detract from sufficient C/N and degree of modulation. When $M_W/T_W \leq 1$, jitter will also be increased. In contrast, when $M_W/T_W > 1$, the C/N, the degree of modulation and the jitter will be satisfactory. In particular, the effect of reducing the jitter is markedly improved when $M_W/T_W \geq 1.3$ It should be noted that the degree of modulation of at least 60% is required for compatibility with DVD-ROM, and $M_W/T_W \geq 1.5$ is preferable to attain such degree of modulation.

In the present invention, the record marks of adjacent two recording tracks may overlap with each other, and as described above, the overlapping record marks will be separated by the crystalline area formed between the two record marks. However, in such a case, the record mark which is partly overwritten by the new record mark will be partly erased, and in order to reduce the proportion of the record mark that is erased by the new record mark, the record marks are preferably formed such that:

$M_W \leq 1.2(G_W + L_W)$

It is more preferable that:

$M_W \leq G_W + L_W$, and more preferable that $M_W < G_W + L_W$

The side walls of the groove are generally sloped, and the boundary between the groove and the land should be determined in calculating the groove width $G_W$ and the land width $L_W$. In the present invention, the boundary between the groove and the land is defined in the surface plane of the substrate as the position corresponding to the center of the groove side wall.

With regard to the length $M_L$ of the shortest record mark, the $M_L$ reduces with the increase in the linear recording density of the medium. In the medium wherein the record mark width is equal to or smaller than the recording track width, the record mark width $M_W$ is limited by the recording track width, and therefore, the length $M_L$ of the shortest record mark should be relatively long to obtains sufficient properties with regard to the C/N, the degree of modulation and the jitter. In contrast, in the present invention, the record mark width $M_W$ is larger than the recording track width, and sufficient properties with regard to the C/N, the degree of modulation and the jitter are obtained even when the length $M_L$ of the shortest record mark is relatively short. More illustratively, the record marks are preferably formed in the present invention such that:

$M_W/M_L \geqq 1$, more preferably such that:

$M_W/M_L > 1$, and most preferably such that:

$M_W/M_L \geqq 1.1$, and therefore, linear recording density can be increased with the reduced $M_L$, and sufficient properties are still realized. When the $M_L$ is reduced in the conventional medium to the level equivalent with the present invention, the properties will be insufficient, and the properties are even further deteriorated when the $M_W/M_L$ is increased to the level equivalent with the present invention, namely, when the $M_L$ is further reduced. It should be noted that $M_W/M_L$ is preferably up to 4, and more preferably up to 3 since an excessively large $M_W/M_L$ will invite cross erase wherein the record marks in the adjacent track are erased or cross talk wherein the record marks in the adjacent track are read out.

It should be noted that the length $M_L$ of the shortest record mark is determined by measuring the maximum length for at least five shortest record marks and averaging the measured lengths.

In the optical recording medium of the present invention, the record marks extend beyond the recording track, and the preferable range of the groove depth is different from that of the medium wherein the record mark width is equal to or less than the recording track width. The tracking signal (push-pull signal) reaches its maximum at $Gd=\lambda/8n$ when the groove depth is Gd, reflectance of the substrate is n, and wavelength of the recording beam is $\lambda$. However, in the medium of the present invention, both the reflectance and the degree of modulation in the crystalline area will be reduced at $Gd=\lambda/8n$, and therefore, Gd of the present invention is preferably $Gd < \lambda/8n$, and in particular, $Gd \leqq \lambda/16n$.

The Gd is preferably $Gd \geqq \lambda/40n$ to ensure sufficient level of push-pull signal for stable tracking. It should be noted that, in the present invention, the crystalline area is used for the non-recorded area and the amorphous area is used for the record mark, and overwriting is conducted by alternating the strength of the single laser beam with no independent erasing procedure.

In the present specification, the ridge protruding to the incident side of the laser beam is referred to as the groove. In the present invention, however, the effects achieved are not significantly different whether the area used for the recording track is the groove or the land.

In the optical recording medium of the present invention, features other than those described above are not critical, and the absolute value of the recording track width, absolute value of the recording track pitch, thickness of the substrate, and the like are adequately determined for the particular case. The present invention, however, is suitable for the medium wherein either one of the groove and the land is used for the recording track, and the track pitch is narrow.

In the optical recording medium of the present invention, various dielectric layers may be provided on at least one side of the recording layer as desired, and various reflective layers may be provided on the side opposite to the side of beam incident side.

The wavelength $\lambda$ of the laser beam used for the overwriting and the reproduction is not limited to any particular range. The wavelength $\lambda$, however, is preferably such that:

$\lambda \leqq 680$(nm)

when high-density recording is desirable.

The lens of the optical system used for the overwriting may have a NA (numerical aperture) of non-limited range. High-density recording, however, is difficult when the NA is too small. Therefore, NA is preferably in the range of:

$NA \geqq 0.6$

Examples of the present invention are given below by way of illustration and not by way of limitation.

EXAMPLES

Example 1

A sample of the optical recording medium comprising a substrate, a first dielectric layer, a recording layer, a second dielectric layer, a reflective layer, and a protective layer was prepared by the procedure as described below.

A disc shaped substrate having a diameter of 120 mm and a thickness of 0.6 mm was prepared by injection molding polycarbonate (refractive index n=1.58). Grooves were simultaneously formed in the injection molding of the substrate to a depth Gd of 24.7 mm. This depth Gd corresponds to $\lambda/16n$ since the recording/reproducing light beam used in the Examples had a wavelength of 638 nm.

The first dielectric layer was formed by sputtering in an argon atmosphere using ZnS (85 mol %)—$SiO_2$ (15 mol %) for the target. The first dielectric layer was formed to a thickness of 200 nm.

The recording layer was formed by sputtering. The composition (atomic ratio) of the recording layer was $Ag_{6.74}In_{4.39}Sb_{60.64}Te_{28.23}$. The recording layer was formed to a thickness of 20 nm.

The second dielectric layer was formed as in the case of the first dielectric layer. The second dielectric layer was formed to a thickness of 20 nm.

The reflective layer was formed by sputtering in argon atmosphere by using Al—1.7 at % Cr for the target. The reflective layer 5 was formed to a thickness of 100 nm.

The protective layer was formed by applying a UV curable resin by spin coating and exposing it to UV for curing. The protective layer as cured had a thickness of 5 $\mu$m.

The thus produced samples were initialized by a bulk eraser. The initialized samples were then overwritten on an optical recording medium evaluator at a wavelength of 638 nm, a NA (numerical aperture) of 0.6, a linear velocity of 3.5 m/s, a recording power of 13.0 W, and an erasing power of 6.5 mW with 8–16 modulated signal (shortest record mark: 3T). In the overwriting, grooves were used for the recording track. In this sample, $T_W/(G_W+L_W)$ was 0.42. It should be noted that the recording track pitch ($G_W+L_W$) was 0.74 $\mu$m.

In the overwriting, the maximum width $M_W$ of the recording mark was altered by regulating the timing of the rise of the laser beam wave form of the optical recording medium evaluator to thereby alter the $M_W/T_W$ as shown in Table 1. In the case of the $M_W/T_W$ of 0.95, the $M_W/T_W$ was realized by reducing the recording power. The degree of modulation and the jitter were measured for each value of the $M_W/T_W$. The results are shown in Table 1. The size of the shortest record mark was also measured for each case to calculate the $M_W/M_L$. The results are also shown in Table 1.

Figure 2:
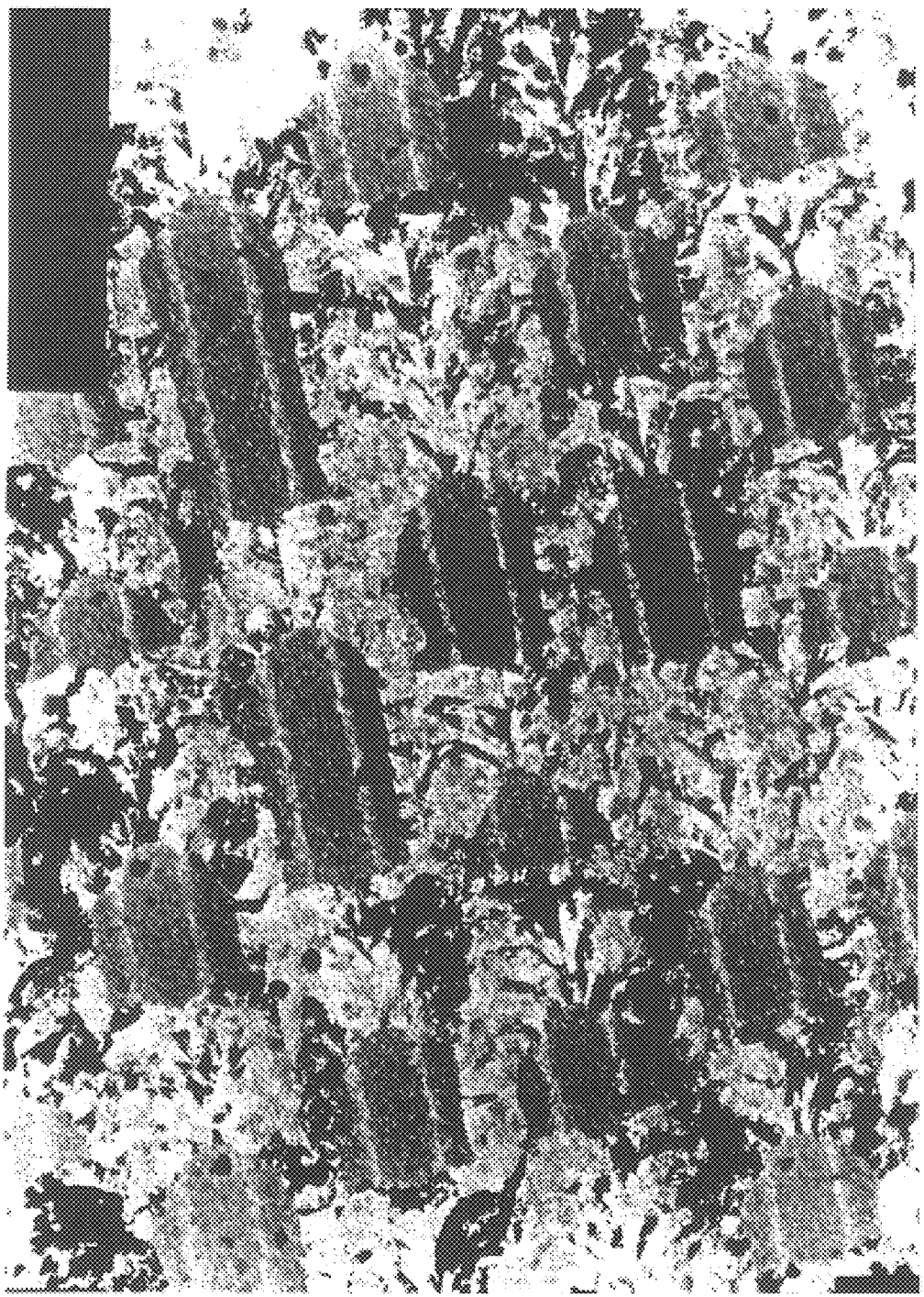
FIG. 2 is a photograph of the recording layer having record marks formed therein taken by a transmission electron microscope for the purpose of showing the crystalline structure.

The $T_W$ and the $M_W$ were measured by a transmission electron microscope. The transmission electron micrograph for the case wherein $M_W/T_W$ was 1.92 is shown in FIG. 2. As clearly shown in FIG. 2, the record marks which are schematically shown in FIG. 1 extend beyond the recording tracks (grooves).

TABLE 1

$G_d = \lambda/16n$, $T_W/(G_W + L_W) = 0.42$

| $M_W/T_W$ | $M_W/M_L$ | Degree of modulation % | Jitter % |
|---|---|---|---|
| 1.35 | 1.0125 | 58.2 | 9.0 |
| 1.55 | 1.1625 | 63.2 | 8.2 |
| 1.67 | 1.2525 | 66.5 | 7.8 |
| 1.92 | 1.44 | 69.6 | 7.1 |
| 0.95* | 0.7125 | 49.2 | 10.4 |

*) Outside the claimed scope or the preferable range

As demonstrated in the results shown in Table 1, a high degree of modulation as well as a jitter of less than 10% are realized when $M_W/T_W$ is within the scope of the present invention, and a degree of modulation of 60% or more is realized when $M_W/T_W \geq 1.5$. It should be noted that the jitter measured herein is the clock jitter evaluated by recording 8–16 modulated signals, measuring the reproduced signal by time interval analyzer (TIA), and calculating $\sigma/T(\%)$ wherein T stands for the window width.

Example 2

Optical disc samples were prepared by repeating the procedure of Example 1 except that the groove depth Gd was of the values shown in Table 2, below. These samples were overwritten on an optical recording medium evaluator under the conditions that realize $M_W/T_W$ of 1.92. The degree of modulation was then measured by repeating the procedure of Example 1. Reflectance and push-pull signal level were also evaluated. The results are shown in Table 2.

TABLE 2

$M_W/T_W = 1.92$, $T_W/(G_W + L_W) = 0.42$

| Sample No. | $G_d$ | Degree of modulation % | Reflectance % | Push-pull signal level |
|---|---|---|---|---|
| 201 | $\lambda/43n$ | 70.6 | 19.7 | 0.18 |
| 202 | $\lambda/27n$ | 70.5 | 19.8 | 0.23 |
| 203 | $\lambda/19n$ | 70.1 | 19.2 | 0.33 |
| 204 | $\lambda/16n$ | 69.6 | 18.5 | 0.41 |
| 205 | $\lambda/13n$ | 68.0 | 17.7 | 0.42 |
| 206 | $\lambda/12n$ | 67.3 | 16.4 | 0.51 |
| 207 | $\lambda/10n$ | 62.4 | 14.3 | 0.57 |
| 208 | $\lambda/9n$ | 62.0 | 13.5 | 0.64 |
| 209 | $\lambda/8n*$ | 59.0 | 13.0 | 0.69 |

*Outside the claimed scope or the preferable range

As demonstrated in Table 2, a sufficient degree of modulation is obtained when $Gd < \lambda/8n$, and reflectance of 18% or more which ensures DVD-ROM compatibility is obtained when $Gd \geq \lambda/16n$. In addition, a sufficiently high level of push-pull signal of 0.20 or more is obtained except for the case wherein $Gd = \lambda/43n$.

Japanese Patent Application No. 221043/1998 is incorporated herein by reference.

Although some preferred embodiments have been described, many modifications and variations may be made thereto in the light of the above teachings. It is therefore to be understood that, within the scope of the appended claims, the invention may be practiced otherwise than as specifically described.

What is claimed is:

1. A method for recording on an optical recording medium having a substrate having grooves formed therein and a recording layer of a phase change type on the substrate wherein a groove or a land between two adjacent grooves is used for the recording track, the record marks are formed such that:

$M_W/T_W > 1$ when $T_W$ is a width dimension of the recording track and $M_W$ is a width dimension of the record mark and wherein $M_W$ is set such that:

$M_W \leq 1.2 (G_W + L_W)$ when $G_W$ is width of the groove, and $L_W$ is width of the land.

2. The optical recording method according to claim 1 wherein the record marks are formed such that:

$M_W/T_W \geq 1.3$

3. The optical recording method according to claim 1 wherein the record marks are formed such that:

$M_W/T_w \geq 1.5$

4. A method for recording on an optical recording medium having a substrate having grooves formed therein and a recording layer of a phase change type on the substrate wherein a groove or a land between two adjacent grooves is used for the recording track, the record marks are formed such that:

$M_W/T_W > 1$ when $T_W$ is a width dimension of the recording track and $M_W$ is a width dimension of the record mark and wherein the record marks are formed such that:

$M_W/M_L \geq 1$ when $M_L$ is length of the shortest record mark.

5. The optical recording method according to claim 4 wherein the record marks are formed such that:

$M_W/M_L \leq 4$.

6. A method for recording on an optical recording medium having a substrate having grooves formed therein and a recording layer of a phase change type on the substrate wherein a groove or a land between two adjacent grooves is used for the recording track, the record marks are formed such that:

$M_W/T_W > 1$ when $T_W$ is a width dimension of the recording track and $M_W$ is a width dimension of the record mark and wherein the groove has a depth Gd such that:

$G_d < \lambda/8n$ when $G_d$ is a depth of the groove, n is a refractive index of the substrate, and $\lambda$ is a wavelength of the recording or reproducing beam.

7. The optical recording method according to claim 1 wherein, in said optical recording medium, the record marks are amorphous and the non-recorded area is crystalline.

8. The optical recording method according to claim 4, wherein the record marks are formed such that $M_W/T_W \geq 1.3$.

9. The optical recording method according to claim 4, wherein the record marks are formed such that $M_W/T_W \geq 1.5$.

10. The optical recording method according to claim 4, wherein, in said optical recording medium, the record marks are amorphous and the non-recorded area is crystalline.

11. The optical recording method according to claim 6 wherein the record marks are formed such that:

$M_W/T_W \geq 1.3$.

12. The optical recording method according to claim 6, wherein the record marks are formed such that $M_W/T_W \geq 1.5$.

13. The optical recording method according to claim 6 wherein, in said optical recording medium, the record marks are amorphous and the non-recorded area is crystalline.

* * * * *